United States Patent [19]

Counceller et al.

[11] 3,846,057
[45] Nov. 5, 1974

[54] APPARATUS FOR INJECTION MOLDING OF RUBBER

[75] Inventors: John D. Counceller, Mount Gilead; Robert T. De Capite, Worthington Hills; John Samuel Burpulis; Robert David Soufie, both of Wilmington, Del.

[73] Assignee: E. I. du Pont de Nemours and Company, Wilmington, Del. ; by said Counceller & De Capite

[22] Filed: Mar. 13, 1972

[21] Appl. No.: 233,889

[52] U.S. Cl.............. 425/207, 222/413, 425/144, 425/242
[51] Int. Cl.............................................. B29f 1/08
[58] Field of Search.................. 259/191, 192, 193; 425/135, 144, 145, 242, 207; 222/413; 264/328, 329, 40; 165/120

[56] References Cited
UNITED STATES PATENTS

| | | | |
|---|---|---|---|
| 2,947,030 | 8/1960 | Varn | 259/191 |
| 3,111,707 | 11/1963 | Buckley | 425/145 |
| 3,436,443 | 4/1969 | Hutchinson | 425/145 X |
| 3,492,700 | 2/1970 | Kornmayer | 425/145 |
| 3,642,402 | 2/1972 | Hutchinson | 425/144 |
| 3,697,204 | 10/1972 | Kryitsis | 425/144 X |
| 3,728,056 | 4/1973 | Theysohn | 425/145 X |

Primary Examiner—Robert B. Reeves
Assistant Examiner—David A. Scherbel

[57] ABSTRACT

A method and apparatus for controlling the input of strip material to the barrel bore of a screw type plasticator wherein the strip is caused to advance endwise toward the bore inlet by a driven feed roll and wherein the strip is permitted to loop away from the feed roll surface and interrupt the feeding action thereof whenever the demand of the screw for more input material has been satisfied. The speed of rotation of the screw is gradually increased during backward reciprocation of the screw whereby melt temperature through the entire shot of rubber is maintained substantially constant.

1 Claim, 7 Drawing Figures

APPARATUS FOR INJECTION MOLDING OF RUBBER

BACKGROUND OF INVENTION

This invention relates to methods and apparatus for injection molding of rubber injected into a mold cavity by a reciprocating screw extruder.

Heretofore, the plastic industry has utilized reciprocating screw extruders, such as disclosed in the patent granted to Willert, U.S. Pat. No. 2,734,226, for injection molding of thermoplastic materials. In utilizing such devices, it is sometimes desirable to maintain constant or to increase the temperature of thermoplastic materials being injected into a mold cavity. To achieve such constant "melt" temperature of thermoplastic, various methods and apparatus have been suggested, such as those disclosed in the patent to Kornmayer, U.S. Pat. No. 3,492,700. Kornmayer discloses that constant melt temperature of thermoplastics to be injected into a mold cavity by a reciprocating screw extruder may be achieved in various equivalent ways, as by (1) varying injection rate (the speed of forward movement of the screw); (2) varying the reaction force retarding screw recession (as by restricting the return or low pressure fluid flow from the low pressure side of a hydraulic cylinder for reciprocating the screw); and/or (3) varying the speed of rotation of the screw. Because the present invention contemplates injection molding of rubber injected by a reciprocating screw extruder, certain of the methods disclosed by the prior art for maintaining constant melt temperature of thermoplastics have not proved totally satisfactory or without operational disadvantages. Injection molding of rubber, a thermosetting material, is particularly problematic in comparison to thermoplastics for a number of reasons. Rubber molding techniques, according to the present invention, require generally narrower range of mold temperatures, and permit relatively smaller temperature differential in different portions of rubber injected into the mold. Additionally, rubber curing is a function of both time and temperature, the higher the temperature the faster the curing rate. This characteristic provokes temperature differentials both in various portions of the mold during the hold cycle as well as in the extruder barrel during the plasticating and injection cycle. Still further, because of the relatively higher injection viscosity of rubber as compared to most thermoplastics, the extruder heating or plasticating effect is not provided by an externally heated extruder barrel as utilized for extruding thermoplastics, but rather is provided by frictional heat generated by shear as the rubber is transferred along the extruder screw. As the screw is reciprocated rearwardly, the operative or effective length thereof is reduced and less friction is induced in the latter part of a "shot" of rubber being transferred thereby generating a temperature differential between the first parts of a shot which are transferred over a relatively long effective screw length and the latter parts of the shot which are at a lower temperature. This temperature differential is problematical because the first and hotter parts of a shot injected into a mold cure at a much faster rate than the later injected cooler parts of a shot. If the holding cycle of the shot in the mold is prolonged to the extent that the cooler shot parts are permitted to cure in the mold, then overall cycle time becomes inefficiently long and the initially hotter parts of the shot may become "overcured", brittle, commercially unacceptable. Of course, if the molded rubber element is removed from the mold before sufficient curing of all the portions thereof, undesirable deformation and other disadvantages are incurred.

Prior art practices for increasing melt temperature of thermoplastics injected by a reciprocating screw extruder, such as certain of the practices disclosed in the heretofore identified Kornmayer U.S. Pat. No. 3,492,790 patent have not generally been satisfactory for injection molding of rubber by a reciprocating screw extruder. For example, the Kornmayer method wherein injection rates are increased is of little practical use for rubber because, while it might be theoretically possible to increase injection speeds to achieve the desired melt temperature increase, such is not practically possible because of mechanical and processing limitations. In this regard, it has been experimentally determined that by increasing injection rates of rubber by as much as three fold, no appreciable melt temperature increase of the latter part of the shot is achieved. If in any case, injection rates are increased as much as theorectically required, the front portion of the shot might be burned and become unusable commercially.

The Kornmayer practice for increasing melt temperature of thermoplastics injected by a reciprocating screw extruder wherein the reaction force retarding screw recession is increased as by restricting the return or low pressure fluid flow from the low pressure of a hydraulic cyclinder for reciprocating the screw, likewise has not proved acceptable for rubber. This is because such increase in reaction force retarding screw recession also increases cycle time as well as the time that rubber must dwell in the "precompression" or shot chamber (i.e. the space within the extruder bore provided in front of a retracting screw). Because the viscosity of rubber increases even as the rubber is at a constant temperature (as shown in FIG. 7 of applicants drawings), such increased dwell time increases the extent of curing of portions of the rubber in the extruder barrel thereby inducing an even higher viscosity of portions of the rubber to be injected and thereby making smooth injection to all portions of the mold cavity more difficult. This latter characteristic may also interfere with desired cross-linking of different portions of the shot injected into the mold through different runners wherein proper "knitting" or union of these portions is not secured.

The third practice for increasing melt temperature disclosed by Kornmayer is increasing extruder screw rotation speed or RPM as a need therefore is sensed by a gauge in the rear end of an extruder barrel. However, if this practice were directly applied to rubber, higher initial temperatures in a cycle might actually cause a reduction of the temperature of the latter portions of a shot. There is difficulty in reacting to error sensed by the gauge in time to materially correct that error. Still further, such RPM increase is usually thought to provide little melt temperature increase in low viscosity thermoplastics. However, because of the high injection viscosity of rubber, RPM increase has been found by the present inventors to provide substantial temperature increase in rubber and an effective and efficient means of maintaining a constant temperature throughout a shot of rubber to be injectd. But it should be noted that if melt temperature increase as provided by an RPM increase is to be utilized for this purpose, it must be induced during the operation cycle of the reciprocal screw period requiring such increase.

SUMMARY OF THE PRESENT INVENTION

It is a general object of the present invention to minimize or circumvent the problems heretofore noted.

In achieving this general object, and other objects which will become apparent hereinafter, the present invention provides a short-cycle-time method and apparatus for high quality injection molding of rubber, utilizing a rotatable screw extruder for plasticating rubber, the screw being mounted within an extruder bore for reciprocation between forward and rearward positions for injecting the rubber into a mold cavity. To increase the temperature of the latter portions of a shot to be injected, while reducing recovery time and overall cycle time, the present invention provides means for increasing the speed of rotation of the screw after movement of the screw from its most forwardly position.

In one embodiment of the present invention, the speed of rotation of the screw is increased gradually throughout a majority of the rearward reciprocation of the screw from its most forwardly position.

BRIEF DESCRIPTION OF THE DRAWINGS

In describing the present invention, reference will be made to the accompanying drawings forming a part of the instant disclosure wherein.

DETAILED DESCRIPTION OF THE PRESENT INVENTION

Figure 1:
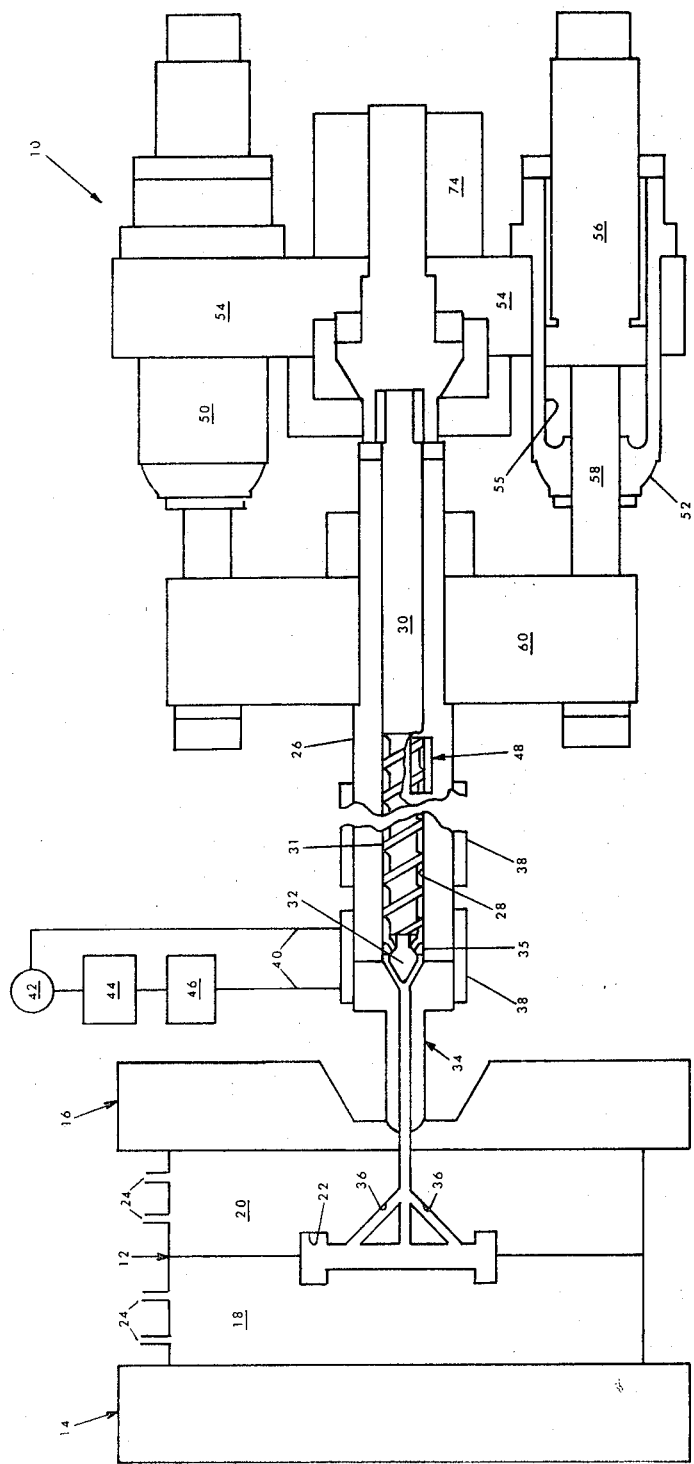
FIG. 1 is a schematic plan view of a reciprocating screw extruder of the in-line type positioned to inject rubber into a mold interposed between elements of an injection clamp.

Referring in more detail to FIG. 1 of the drawings, an apparatus for injection molding of rubber by a reciprocal screw extruder is shown therein. The apparatus generally comprises a rubber plasticating and injection unit 10 for directing rubber melt to a mold 12 positioned between elements of a conventional hydraulically actuated injection molding clamp assembly 14 and 16. The mold 12 is defined by separable mold halves 18 and 20 which include recesses at the interface therof which cooperate to form a rubber article forming mold cavity 22. Conduits 24 for conducting heating fluid or oil to the mold halves are provided, the conduits being connected to any suitable conventional source of heated oil (not shown). Alternately the mold halves might be heated by conventional electric heating means (not shown).

The plasticating unit 10 is generally conventional and similar to the reciprocating screw extruder shown and described in the heretofore noted patent to Willert, U.S. Pat. No. 2,734,226. The plasticating unit comprises an extruder barrel 26 including a bore 28 for rotatably and reciprocally receiving an extruder screw 30 of the type adapted to extrude rubber. It should be noted that as utilized herein the term "rubber" is intended to embrance natural and synthetic rubbers, as well as other high injection viscosity elastomers exhibiting the processing properties of rubber. As reported in an article appearing in the February 1972 issue of "Rubber World", pages 31 – 35, applicant's assignees have utilized EPDM produced by duPont as Nordel 2903 R with good results.

The extruder screw 30 includes helical flighting 31 and on the forward end thereof a conical tip or smear head 32 is provided which cooperates with and extruder nozzle assembly 34 for directed plasticated rubber from the bore 28 through runners 36 to the mold cavity 22. A check ring 35 is positioned about the rear portion of the smear head 32 whereby back flow of a shot along the screw flights is prevented during injection. Positioned about the forward extremity of the extruder barrel 26 is a plurality of fluid conducting coils 38, each of which is connected by suitable conduits 40, (only one pair of which are shown) to a fluid pump 42 for urging pressure fluid through a heat exchanger cooler 44 or an alternately operable fluid heater 46 for cooling or alternately heating fluid to be directed to the fluid coils 38. The fluid heater 46 is only utilized to provide heated fluid to the coils 38 during start-up or idle portions of the cycle of the plasticating unit 10. Subsequently, fluid is not heated but rather is cooled by the heat exchanger 44. Frictional heat from shear is relied upon to plasticate rubber during normal operation of the unit.

Figure 2:
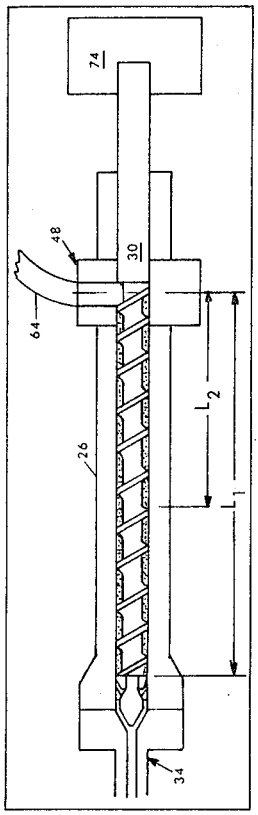
FIG. 2 is a schematic front elevation of portions of the extruder shown in FIG. 1.

Referring to FIG. 2 of the drawing, to reciprocate the screw 30 from a most forwardly position shown in FIG. 2 at a distance $L_1$ from a rubber strip feed orifice assembly 48 to a rearward position a distance of $L_2$ from the feed orifice assembly 48, a pair of hydraulic cylinders 50, 52 (FIG. 1) are provided. The cylinder 50, 52 are fixedly connected by a yoke 54 to the rear end of the screw 30. The cylinders 50, 52 each include a bore 55 in which is positioned a piston 56. The piston 56 is connected by a piston rod 58 fixed to a stationary frame 60. To reciprocate the screw 30, pressure fluid is directed from any suitable source (not shown) to either side of the piston 56 whereby the cylinders 50, 52 are caused to move relative to the stationary pistons and thereby reciprocate the screw fixed to the cylinders and yoke.

Figure 3:
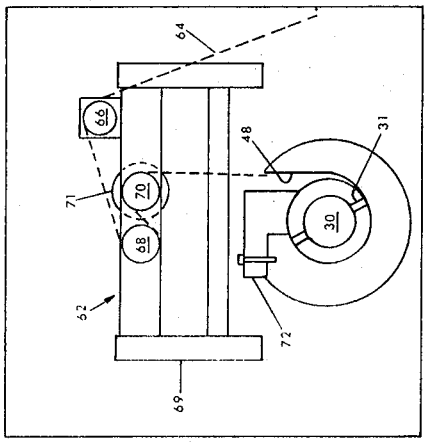
FIG. 3 is a schematic side elevation of a rubber strip feed mechanism adapted to feed rubber strip to the extruder shown in FIG. 2.
Figure 7:
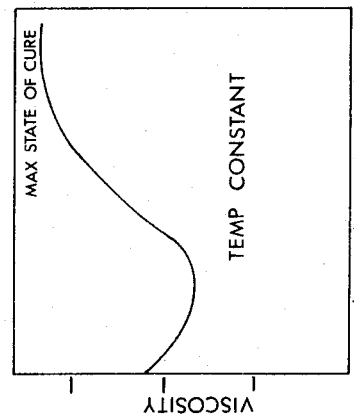
FIG. 7 is a graph of certain characteristics of rubber extruded for injection molding, rubber shot viscosity being plotted against time of curing above room temperature. Of particular importance is the characteristic of rubber wherein viscosity increases as temperature remains constant.

With reference to FIG. 3 of the drawings, a tension control assembly 62 is provided to direct rubber strip 64 to the feed orifice 38 from a coiled, kinked, layered box storage supply (not shown). The tension control 62 is intended to provide an extruder self feed or, stated otherwise, is intended to supply rubber strip 64 at a rate established by screw rotation speed or plasticating rate without strip tension induced as by a "starve" feed or much slack induced as by a "slack" feed. To achieve the desired extruder self feed, the tension control 62 is comprised of a top idler roller 66, for directing strip about a lower idler roller 68, both of which are rotatably mounted on a frame 69. Strip is directed from the lower sides of the lower idler roller 68 to laterally adjacent hydraulically driven feed roller 70. The driven feed roller 70 is positioned to receive strip over the top thereof. The driven feed roller 70 is positioned vertically above the extruder feed orifice 48. The feed roller 70 is driven hydraulically by a motor 71 at a rate at least as great as the maximum strip requirement of the screw at its maximum RPM during maximum rearward reciprocation of the screw. A bridging plate 72 is positioned in the feed orifice 48 to restrain strip initially coiled about the screw 30 from bulging into the path of subsequently entering strip which might otherwise interfere with entering strip feed. Upon the existance of a condition wherein the driven feed roller 70 supplies strip at a rate greater than the screw requires at its then existing RPM, a strip slack loop will be induced, as shown in FIG. 3, which results in a looping of the strip upwardly out of contact with the driven feed roller 70 whereby feed roller advancement of the strip is automatically interrupted until the extruder screw 30 strip requirement utilizes the excess strip supply. In this manner, regardless of variations in screw RPM to maintain melt temperature, properly tensioned strip supply is assured.

Figure 4:
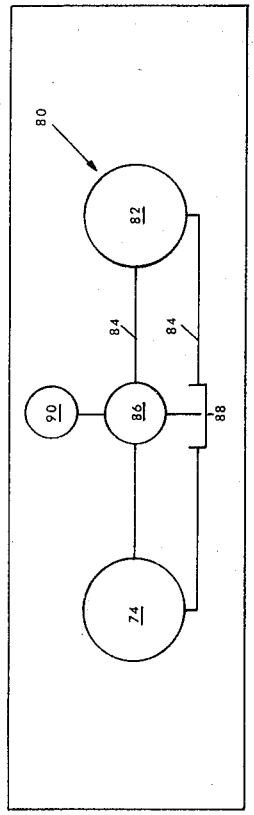
FIG. 4 is a schematic and diagramatic view of a hydraulic circuit according to the present invention adapted to vary the screw speed of the extruder shown in FIGS. 1 and 2 in accordance with rearward screw reciprocation.

To rotate the screw 30 at varying rotational speeds or RPM, a hydraulically actuated motor 74 (FIG. 1) is provided on the rear end of the screw. To control the speed of rotation of the motor 74 and a screw 30 according to the present invention, a screw speed control assembly 80, as schematically shown in FIG. 4, is provided.

In accordance with the present invention, the speed control 80 comprises a hydraulic pump 82 connected by conduits 84 through an electrically actuated flow control valve 86 of a conventional type to the hydraulic motor 74 rotating the screw 30. The valve 86 is disposed to direct a varying portion of the pump 82 output to a reservoir 88 in response to signals from a potentiometer 90, the electrical resistance of which is established by the extent of rearward reciprocation of the screw 30. According to the present invention, after the screw is moved rearwardly from its most forwardly position ($L_1$ from the strip feed orifice) a distance of 10 percent of $L_1$, the potentiometer is operated to graduallly increase resistances and reduce flow diverted by the valve 86 back to the reservoir 88 whereby rotational speed of the motor 74 is gradually increased throughout subsequent rearward reciprocation of the screw until the screw reaches its most rearwardly position a distance of $L_2$ from the feed orifice 48 (as shown in FIG. 2).

Alternately, one or more limit switches (not shown) may be positioned to be sequentially actuated by rearward reciprocation of the screw 30 to actuate one or more valves and corresponding conduit restrictions to divert progressively less fluid flow from the pump 82 through the valves back to the reservoir whereby a stepped increase in motor RPM is provided in accordance with rearward reciprocation of the screw 30.

Figure 6:
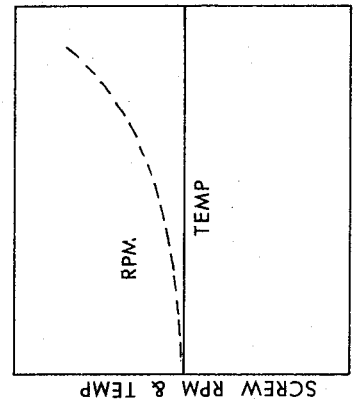
FIG. 6 is a graph plotted similarly to the graph of FIG. 5 but showing graphically, the results achieved by utilizing the present invention.
Figure 5:
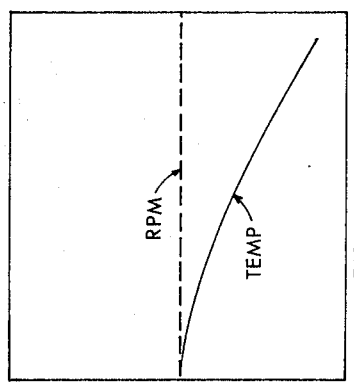
FIG. 5 is a graph of the operational cycle of a reciprocating screw extruder utilized according to the prior art in injecting rubber into a mold cavity, the graph including screw speed and melt temperature plotted against screw displacement.

It should be noted that prior art devices might be utilized to provide a process of injection molding of rubber by a reciprocating screw extruder wherein melt temperature varies as indicated in FIG. 5. Advantageously, the present invention is utilizable to provide the constant melt temperature as shown in FIG. 6.

Although the present invention has been described with reference to one embodiment, it should be appreciated that various modifications and substitutions may be made which are embraced by the present invention, the scope is to be determined by reference to the appended claims.

We claim:

1. In a cyclically operable reciprocating screw injection molding machine for molding a succession of articles of an elastomeric material, said machine including a reciprocable, rotatably driven screw disposed within a barrel having an outlet adjacent its front end and an inlet displaced rearwardly from said outlet, mold means operably connected to said barrel outlet, means for rotating said screw for masticating and heating said material while feeding it toward said front end of the barrel and while said rotating screw is recprocated toward the rear of said barrel, means for causing forward reciprocation of said screw to inject said heated material through said barrel outlet into said mold means, and means for heating said mold means to effect at least substantial curing of said elastomeric material, the improvement comprising:

means for causing the screw to rotate during an initial part of the rearward reciprocation of the screw in each cycle at a first speed sufficient to elevate the temperature of said elastomeric material to a first level;

means for causing increased rotational speed of the screw during the remaining part of said rearward reciprocation of the screw in each cycle to elevate the temperature of said elastomeric material accumulated in rearward portions of the barrel to a level close to the temperature of the elastomeric material near said outlet; and means for feeding elastomeric material into said barrel inlet at rates determined by the demand of the screw for new material at any speed of rotation of said screw.

* * * * *